United States Patent [19]
Huppenthal et al.

[11] Patent Number: 5,491,300
[45] Date of Patent: Feb. 13, 1996

[54] PENETRATOR AND FLEXIBLE CIRCUIT ASSEMBLY FOR SEALED ENVIRONMENT

[75] Inventors: Jon M. Huppenthal; Candy L. Saunders, both of Colorado Springs; Joseph E. Jaramillo, Pueblo, all of Colo.

[73] Assignee: Cray Computer Corporation, Colorado Springs, Colo.

[21] Appl. No.: 234,253

[22] Filed: Apr. 28, 1994

[51] Int. Cl.$^6$ .............................. H01B 17/30; H05K 5/06
[52] U.S. Cl. .................... 174/151; 174/65 R; 174/50.56; 174/50.61; 174/50.62; 174/52.2; 174/52.3
[58] Field of Search ............................ 174/151, 76, 77 R, 174/65 R, 50.56, 50.61, 50.62, 52.2, 52.3, 65 SS, 65 G, 152 G, 153 G

[56] References Cited

U.S. PATENT DOCUMENTS

| | | |
|---|---|---|
| 3,038,140 | 6/1962 | Haberland ........................ 174/77 R X |
| 4,313,030 | 1/1982 | Bosch ....................... 174/151 |
| 4,537,458 | 8/1985 | Worth . |
| 4,636,581 | 1/1987 | Roche et al. . |
| 4,859,812 | 8/1989 | Klosin et al. . |
| 4,924,038 | 5/1990 | Klosin et al. . |
| 5,131,233 | 7/1992 | Cray et al. . |

Primary Examiner—Morris H. Nimmo
Assistant Examiner—Paramita Ghosh
Attorney, Agent, or Firm—Carol W. Burton; Holland & Hart

[57] ABSTRACT

A penetrator and flexible circuit apparatus comprises a penetrator housing having a passageway through which at least one elongated flat flexible circuit having a plurality of parallel electrical traces is placed. A retention material substantially occupies the passageway to retain the flexible circuit in the passageway, to establish a hermetic seal of the flexible circuit within the penetrator and to thereby seal the interior of a computer which is cooled by cooling fluid from its exterior environment.

27 Claims, 7 Drawing Sheets

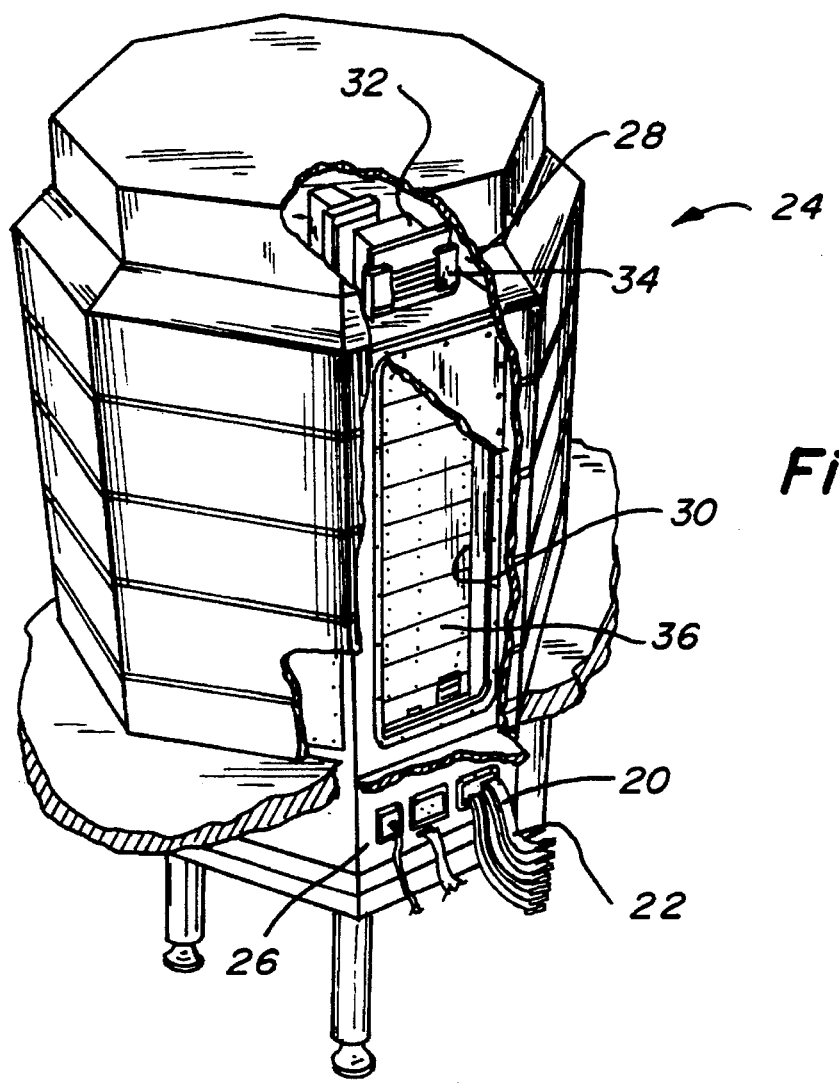
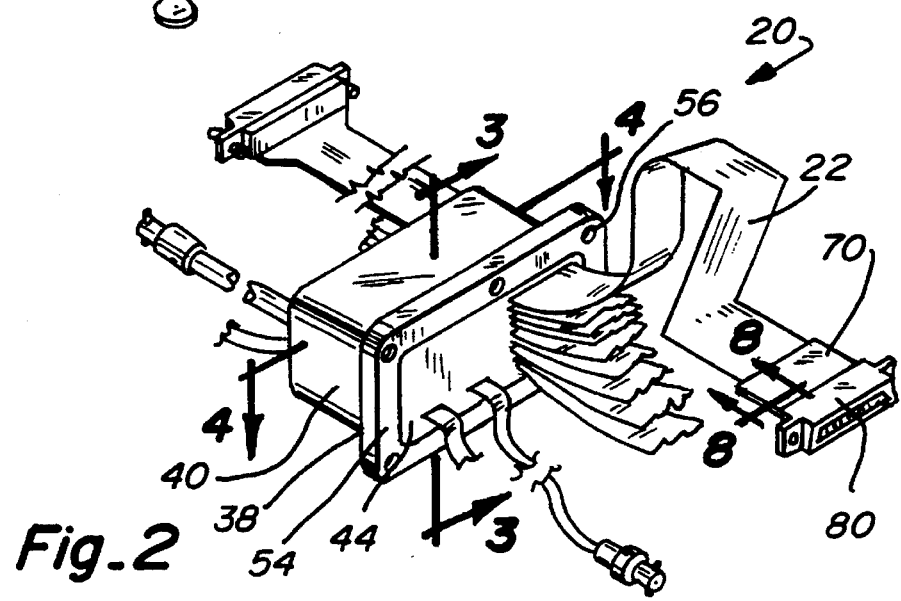

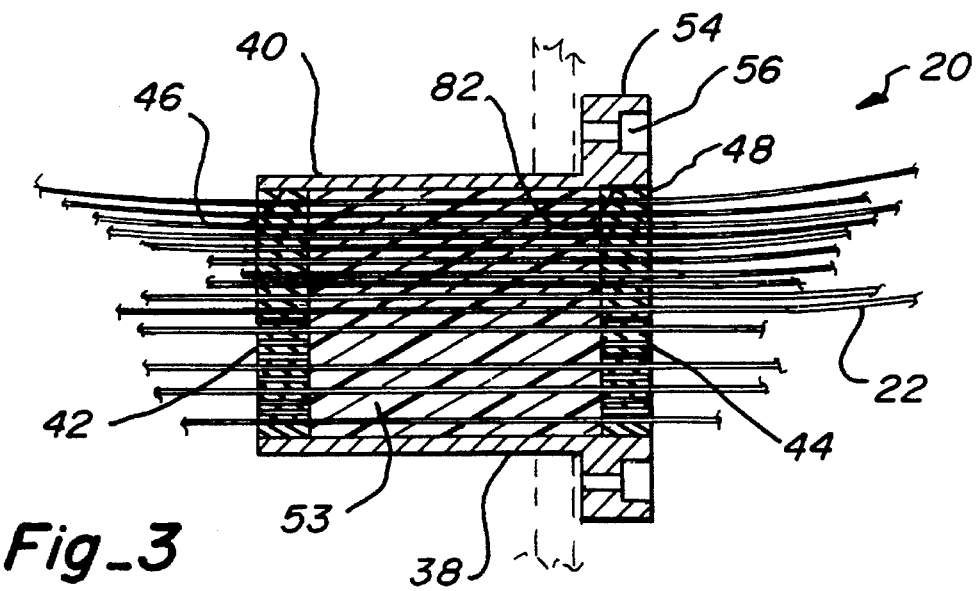
Fig_3
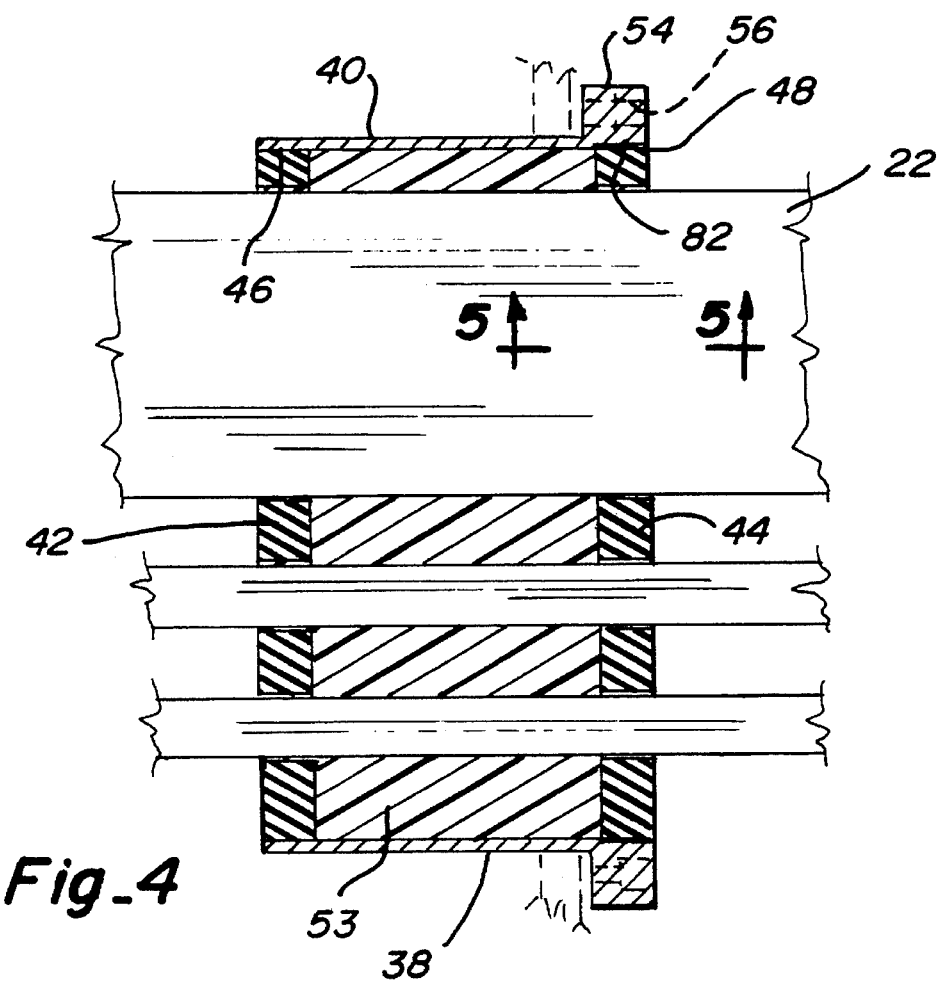
Fig_4

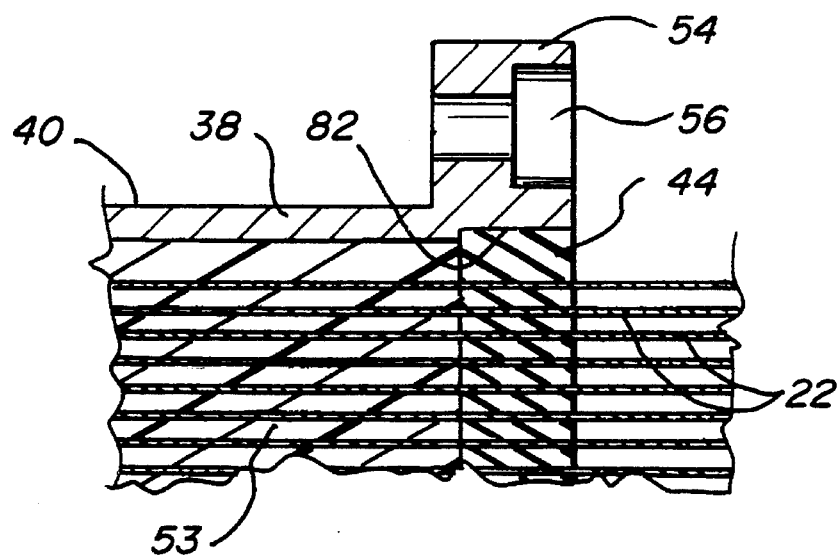
Fig_5
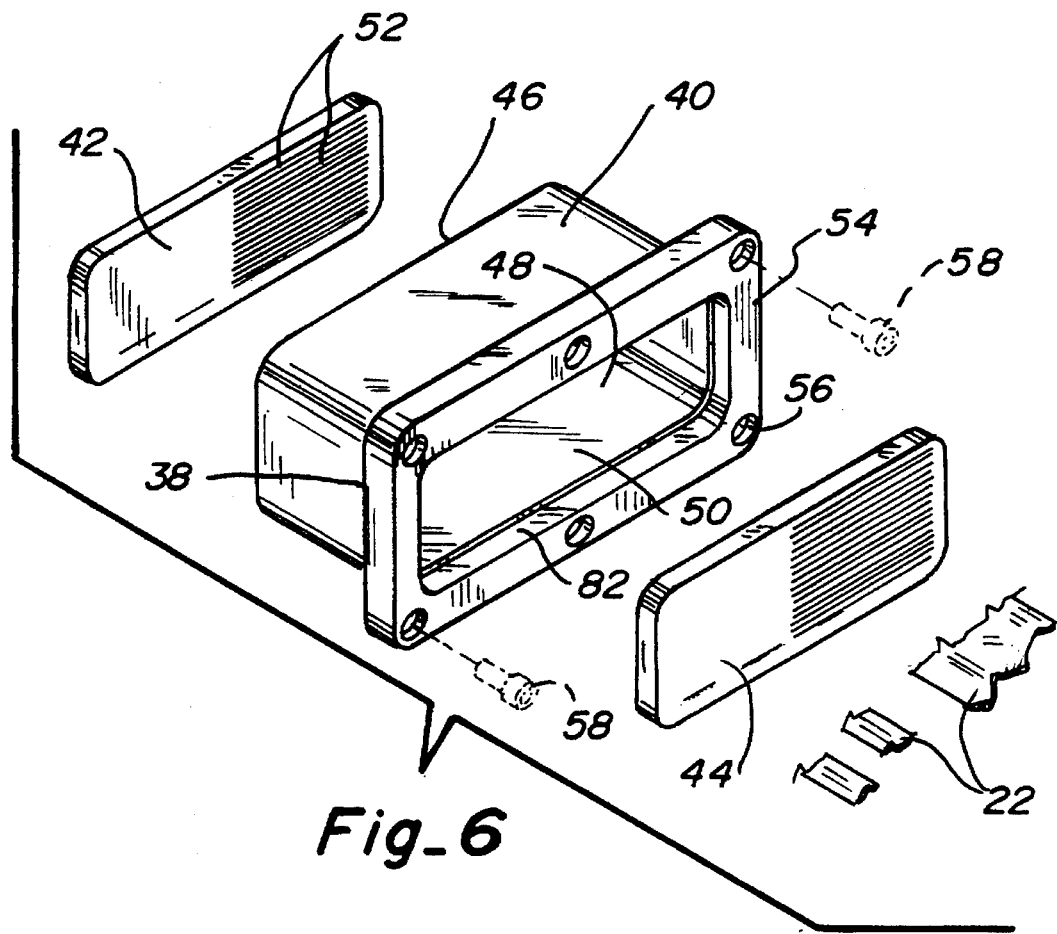
Fig_6

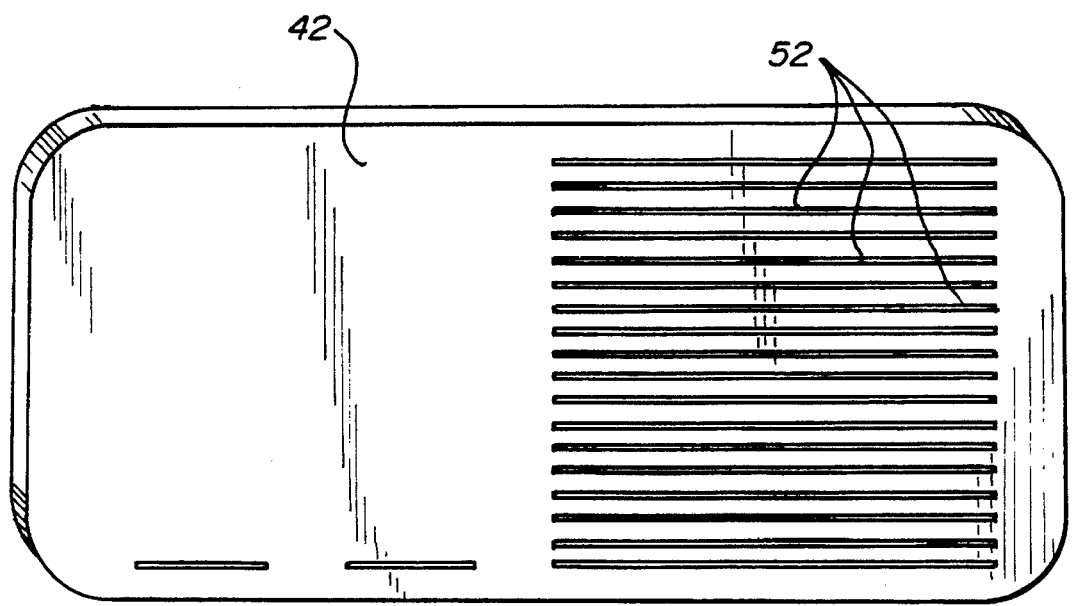
Fig_7
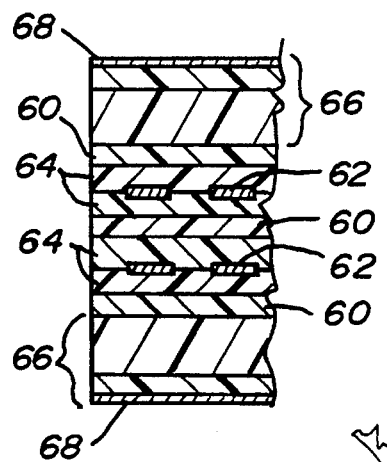
Fig_8
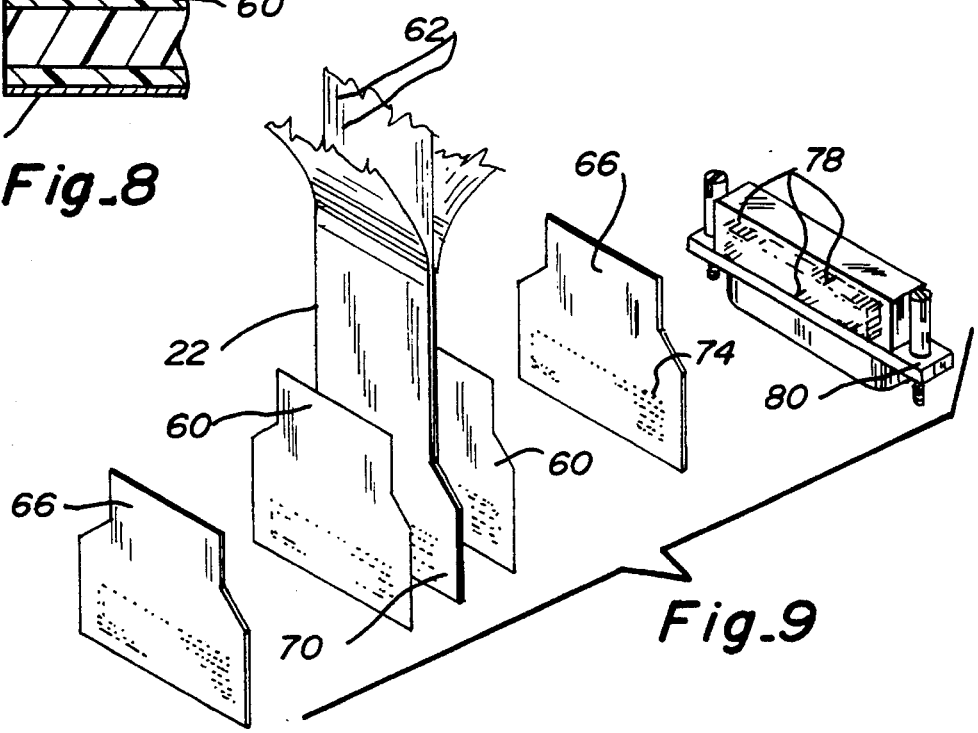
Fig_9

Fig_11

PENETRATOR AND FLEXIBLE CIRCUIT ASSEMBLY FOR SEALED ENVIRONMENT

FIELD OF THE INVENTION

This invention relates to electrical connections and transmission of signals through and between sealed environments. More particularly this invention relates to a new and improved penetrator for maintaining electrical connections between sealed environments and transmitting signals between the sealed environments over one or more flexible controlled impedance circuits.

BACKGROUND OF THE INVENTION

A variety of circumstances and situations exist where it is necessary to transmit electrical signals from one environment to another environment, and the two environments must be hermetically sealed or isolated from one another. Although satisfactory electrical connectors have been developed for many of these situations, others remain particularly difficult. For example, one such situation involves high speed, high capacity digital computers, referred to hereinafter as supercomputers.

Supercomputers generate relatively high heat densities, for example, in the range of 275 watts per cubic inch. To cool the components of supercomputers, a high density dielectric liquid coolant is delivered under pressure to and circulated over the components of the supercomputers. Because supercomputer components are submerged in the high density coolant, seals to the external environment must be maintained to control coolant flow and to contain the coolant within the supercomputer.

Transmission of high frequency signals to and from supercomputers has sometimes been achieved by using very small gage twisted wire pairs or coaxial cables. Twisted wire pairs are suitable for supercomputer signal transmission because the paired configuration achieves a controlled impedance signal path.

Twisted wire pairs, like other cables used with supercomputers, must penetrate the supercomputer cabinet through a seal. However, the insulation which surrounds the conductors of twisted wire pairs will act like a conduit through which the coolant will flow. Consequently, if the insulation is allowed to penetrate the boundary between the two environments, it becomes difficult to create and maintain a seal between the pressurized, liquid-filled interior of the cabinet and the exterior ambient environment.

To address the problem of coolant leakage via the insulation of twisted wire pairs, the insulation is stripped for a short length, each stripped conductor is physically isolated from adjacent conductors, and the separated stripped conductors are mounted in potting compound in a connector housing. Once the potting compound cures into a solid mass, the housing is mounted to the supercomputer cabinet.

Unfortunately, the fragility of the small gage conductors results in significant breaking and shorting of conductors during the stripping and mounting process. In addition, the separation of the twisted wire pairs creates discontinuities in the path impedance where the conductors are separated. Usually the integrity of the connections cannot be tested until after manufacturing of the assembly is complete. Because of the permanency of the potting compound, repairs to the twisted wire pairs are not practical.

To compensate for the expected percentage of damaged or nonfunctional twisted wire pairs, spare conductors are stripped and mounted in the potting compound. Often twice as many connections are installed in a housing as are needed, based on the expectation that up to one half the twisted wire pairs will not transmit signals satisfactorily. This multiplies both labor and material costs for what already is a very labor intensive and costly manufacturing process.

While the above techniques address problems of maintaining seals in a supercomputer, other problems have resulted from use of the above techniques. For example, the need to manually strip each conductor and manually install the stripped conductor in physical isolation from adjacent conductors limits the number of conductors which can be closely positioned in a connector housing. This limitation on density of the conductors is exacerbated by the fact that approximately half of the twisted wire pairs are expected to not function satisfactorily, in part because adjacent stripped conductors are susceptible to shorting. Moreover, even when twisted wire pairs mounted in potting compound are initially functional, they remain susceptible to breaking and shorting at point of contact with the hardened potting compound when the wires are strained or repeatedly flexed.

It is against this background that the significant improvements and advancements of the present invention have taken place.

SUMMARY OF THE INVENTION

The present invention offers the capability of an effective seal at the point where conductors penetrate the sealed environments while at the same time preventing conductor breaks shorts and impedance signal path discrepancies. In addition the present invention offers the capability of increasing the density of conductors which penetrate the sealed environments and of reducing the time required for manufacturing the penetrator assembly.

In accordance with its major aspects, a penetrator and flexible circuit apparatus of the present invention comprises a penetrator housing including a flange portion and a sleeve portion having a passageway through the penetrator housing, at least one elongated flat flexible circuit which has a plurality of parallel electrical traces extending therealong, and a retention material substantially occupying the passageway and surrounding the flat flexible circuit. The retention material retains the flexible circuit in the passageway of the penetrator housing and establishes a hermetic seal of the flexible circuit within the penetrator sleeve. Preferably and in addition, a sealing element is compressed against the penetrator housing to establish a hermetic seal against the penetrator housing and a wall which separates two hermetically sealed environments, such as the interior of a computer which is cooled by cooling fluid and the exterior environment.

In accordance with some of its preferred aspects, the penetrator and flexible circuit apparatus includes opposing plates each having a slot in alignment with the slot of the opposing plate. A seal surrounds each penetrator housing between the plates. A plurality of penetrator housings may be positioned between the plates. The seal preferably takes the form of a gasket which is compressed upon forcing the two plates together upon connecting the plates to the wall. A plurality of flexible circuits are preferably located in a stack in the passageways of the penetrator housings, and epoxy surrounds each stack of flexible circuits within each passageway.

In accordance with another of it major aspects, the present invention includes a method for communicating electrical signals into and out of a computer having elements hermetically enclosed within a wall within which fluid under pressure is also confined. The electrical signals have a sufficiently high communication frequency to result in substantial signal degradation due to substantial impedance variations between the conductors. The method comprises the steps of inserting at least one elongated flat flexible circuit having a plurality of parallel controlled impedance electrical traces extending therealong into a passageway of a penetrator housing, positioning the elongated flat flexible circuit to extend both ends of the flexible circuit out of the passageway on opposite ends of the passageway and away from the penetrator housing, establishing a first hermetic seal between the flexible circuit and the penetrator housing within the passageway, retaining the flexible circuit in the passageway of the penetrator housing to maintain the first hermetic seal, and establishing a second hermetic seal between the penetrator housing and the wall of the computer.

In accordance with some of it preferred aspects, the method further comprises the steps of inserting a sealing material such as a fluid epoxy in the passageway and substantially surrounding the flexible circuit and allowing the epoxy to cure to establish the first hermetic seal and to retain the flexible circuit in the passageway. When a plurality of flexible circuits are positioned in a stack within the passageway, the fluid epoxy material may be inserted between adjoining ones of the flexible circuits in the stack, after which the flexible circuits of the group are drawn simultaneously into the passageway to distribute the fluid epoxy material between the flexible circuits and around the exterior flexible circuits in the passageway.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a perspective view, with a portion broken out, of a supercomputer utilizing a penetrator and flexible circuit assembly incorporating the present invention.

FIG. 2 is an enlarged perspective view of the penetrator and flexible circuit assembly shown in FIG. 1.

FIG. 3 is a partial enlarged section view of the penetrator and flexible circuit assembly taken substantially in the plane of line 3—3 in FIG. 2.

FIG. 4 is a partial enlarged section view taken substantially in the plane of line 4—4 in FIG. 2.

FIG. 5 is a partial enlarged section view taken substantially in the plane of line 5—5 in FIG. 4.

FIG. 6 is an exploded perspective view of some of the elements of the penetrator and flexible circuit assembly shown in FIG. 2.

FIG. 7 is an enlarged elevational view of a sealing member of the penetrator and flexible circuit assembly shown in FIG. 2.

FIG. 8 is a partial enlarged section view of the flexible circuit taken substantially in the plane of line 8—8 of FIG. 2.

FIG. 9 an exploded view of the end portion of a flexible circuit shown in FIG. 2, showing the connection of a terminal end connector.

DETAILED DESCRIPTION

Figure 10:
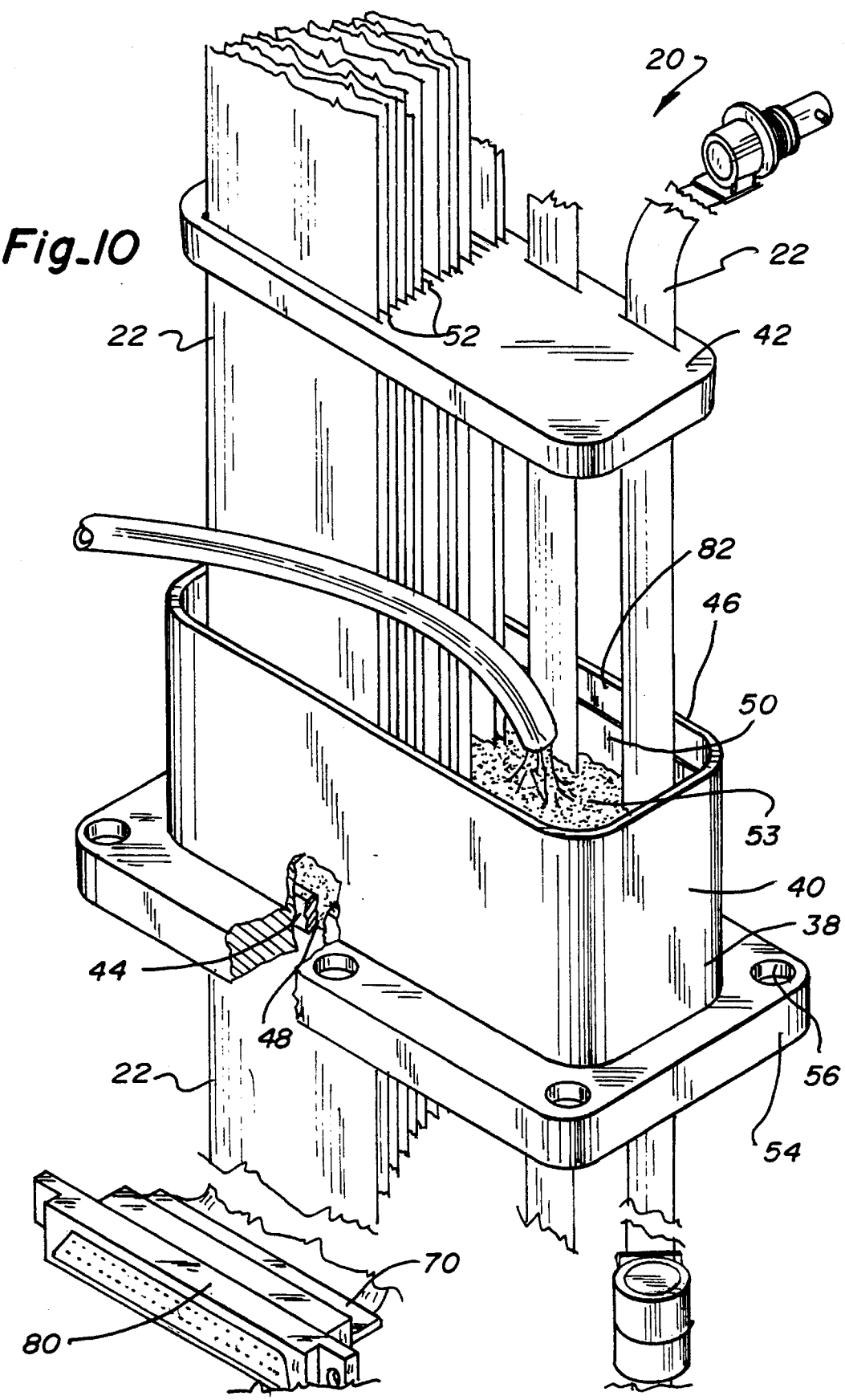
FIG. 10 is an exploded perspective view of the penetrator and flexible circuit assembly shown in FIG. 2 showing the penetrator and flexible circuit assembly partially assembled.

One presently preferred embodiment of a penetrator and flexible circuit assembly 20 for transmitting controlled impedance signals to and from a computer and for maintaining a sealed environment at the point of penetration of a housing or shell 26 of a hermetically sealed computer, such as a supercomputer 24, is shown in FIG. 1.

The shell 26 of the supercomputer 24 divides the interior into an upper compartment 28 and lower compartment 30. Logic, I/O, and memory modules 32 are mounted in the upper compartment 28. A power buss 34 extends between the upper and lower compartments 28 and 30. Mounted in the lower compartment 30 are power supplies 36 which deliver power over the power buss 34 to the modules 32. The upper and lower compartments 28 and 30 are pressurized to maintain a flow of coolant throughout the upper and lower compartments 28 and 30 to dissipate heat generated by the modules 32, the power buss 34 and the power supplies 36.

The penetrator and flexible circuit assembly 20 includes a penetrator housing 38 and one or more conventional elongated flexible circuits 22, as shown in FIG. 2. Each flexible circuit 22 is electrically connected to a module 32 in the interior of the shell 26. Each flexible circuit 22 is connected on the exterior of the computer shell 26 to a conventional input/output device (not shown). The flexible circuits 22 create controlled impedance signal paths between the modules 32 and the input/output devices by which to communicate very high frequency signals.

Each flexible circuit 22 exits the computer shell 26 through the penetrator housing 38, which is shown in greater detail in FIGS. 3–6. The penetrator housing 38 includes a substantially boxlike sleeve portion 40, with an open inner end 46, an opposing open outer end 48, and a passageway 50 defined therebetween and through the sleeve portion 40. An inner resilient sealing member 42 is positioned within the passageway 50 at the inner end 46 of the housing 38 and an outer resilient sealing member 44 is positioned within the passageway 50 at the outer end 48 of the housing 40.

A plurality of parallel slits 52 are formed in and extend through each of the inner and outer sealing members 42 and 44. The slits 52 in each of the sealing members 42 and 44 occupy corresponding positions at the respectively opposite ends of the passageway 50. The slits 52 therefore align with one another through the passageway 50 and are each positioned to accept a flexible circuit 22. The flexible circuits 22 are positioned to extend through the passageway 50 between the aligned slits 52 formed in the sealing members 42 and 44.

Hardened and cured potting compound 53 occupies the space within the passageway 50 between the sealing members 42 and 44 and surrounding the segments of the flexible circuits 22. The hardened potting compound 53 holds the circuits 22 in place relative to the penetrator housing 38, and holds the sealing members 42 and 44 in place at the ends 46 and 48 of the passageway 50, thereby completing the penetrator assembly 20.

A flange 54 extends from the housing 38 at the outer end 48. Holes 56 are formed in the flange 54 to receive bolts or screws 58 for mounting the penetrator and circuit assembly 20 to the shell 26 of the supercomputer 24. A gasket (not shown) is placed between the flange 54 and the shell 26 to establish a hermetic seal at that location. The hardened potting compound 53 establishes a hermetic seal through the passageway 50 and around the flexible circuits 22. In this manner, a hermetic seal is established between the interior of the computer 24 and its exterior environment, and the flexible circuits 22 carry signals between these two environments.

Each flexible circuit 22 is of a conventional construction, preferably formed as a laminate, as shown in FIGS. 8 and 9. A typical flexible circuit is preferably constructed of layers of Kapton™ plastic 60, copper traces 62, acrylic adhesive 64 and a plastic stiffener/copper shielding laminate 66, all of which are assembled using conventional manufacturing techniques. The traces 62 are deposited or otherwise applied to the plastic 60. The copper shielding layer 68 of the laminate 66 is located in proximity adjacent to the copper traces 62, and thereby establishes a controlled and constant impedance between these two conductors. The controlled impedance allows signals to be conducted over the traces 62 at considerably higher frequencies without significantly degrading the essential characteristics of the signals.

Expanded portions 70 are formed at each end of the flexible circuits 22. The stiffener/copper shielding laminate 66 is attached at these expanded ends 70 to prevent twisting of the flexible circuit 22. The traces 62 terminate at perforations 74 at opposite ends 76 of the flexible circuit 22. Pins 78 of terminal end connectors 80 are inserted through the perforations 74 and soldered to the traces 62 at the perforations. The pins 78 are electrically connected to other pins or sockets formed in the terminal end connectors 80 by which to transmit and receive the high frequency signals on the traces 62 of the flexible circuits 22.

The controlled impedance signal transmission characteristics of the flexible circuits 22 achieve the important advantage of allowing high data communication rates between the computer 24 and the input/output devices connected to the computer. A considerably higher number of traces 62 are located in the same space than could be occupied by other high frequency conductors, such as coaxial cables. Thus not only are high data communication rates achieved, but more signal conductors are available to conduct the high frequency signals, thereby achieving very high data throughput capacities in relatively small areas encompassed by each penetrator and circuit assembly 20. Moreover, fewer penetrator and circuit assemblies 20 are required to penetrate the computer shell 26, thereby reducing the number of possibilities of leaks and also reducing the labor required to connect the penetrators to the computer.

The inner and outer sealing members 42 and 44, respectively, are each of a substantially rectangular configuration made from a resilient material, such as rubber. The resilient material provides some curvature and flexibility for bending the flexible circuits 22 at the point where they exit the hardened potting compound 53. As a result, it is difficult or impossible to bend the flexible circuits around a sharp corner at the surface of the potting compound 53 and break or damage the traces 62 or the shielding 68 at the bend. The sealing members 42 and 44 are also useful in confining the fluid potting compound 53 in the passageway 50 while it cures and hardens.

The sealing members 42 and 44 are located in recesses 82 formed in the interior of the sleeve 40 adjacent to the ends, as shown in FIGS. 5, 6 and 10. The recesses 82 are sized to receive and retain the inner and outer sealing members 42 and 44 during the assembly of the penetrator and flexible circuit assembly 20.

Assembly of the penetrator and flexible circuit assembly 20 is understood by reference to FIG. 10. Initially, each flexible circuit 22 is inserted through the corresponding slits 52 in the inner and outer sealing members 42 and 44. Due to the resiliency of the material from which the sealing members 42 and 44 are constructed, the slits 52 spread sufficiently to insert the expanded portions 70 of the flexible circuits 22 prior to attaching the terminal end connectors 80 to one of the ends of the flexible circuits 22.

After insertion of the flexible circuits 22 through the outer sealing member 44, the outer sealing member 44 is positioned in the recess 82 of the penetrator housing 38 adjacent to the outer end 48. The housing 38 is oriented with the sleeve 40 oriented vertically upward.

Liquid potting compound 53 or other sealing material is introduced into the passageway 50 through the upward facing inner end 46. The liquid potting compound 53 flows between adjacent flexible circuits 22 and throughout the passageway 50, until the passageway 50 is filled to the level of the recess 82 at the inner end 46.

The inner sealing member 42 is lowered along the flexible circuits 22 into the inner end 46 of the sleeve 40, until it rests in the recess 82 and against the potting compound 53. When the potting compound 53 cures, it grips the inner contacted surfaces of the sealing members 42 and 44 and holds them in place.

Upon curing, the penetrator housing 40, inner and outer sealing members 42 and 44, and the potting compound 53, form an integral mass surrounding the flexible circuits 22. After curing is complete, the penetrator and flexible circuit assembly 20 is mounted to the shell 26 of the supercomputer 24 using the screws 58.

The penetrator and flexible circuit assembly 20 provides an effective seal with the supercomputer 24. Conductor shorts, breaks, and other signal path discrepancies are prevented by the encasement of the flexible circuits 22 in cured potting compound 53 without need for stripping conductors or otherwise disturbing electrical continuity and the impedance characteristics between the traces 62 and the shielding 68. Signal path discrepancies are also prevented by the resilient inner and outer sealing members 42 and 44, which provide strain relief to the flexible circuits 22. Moreover, because each flexible circuit 22 is typically manufactured by machine rather than manually, the density of traces 62 of the flexible circuits 22 passing through the penetrator housing 38 is maximized. Furthermore, the penetrator and flexible circuit assembly 20 is relatively quickly assembled, thereby decreasing manufacturing time and costs.

Figure 11:
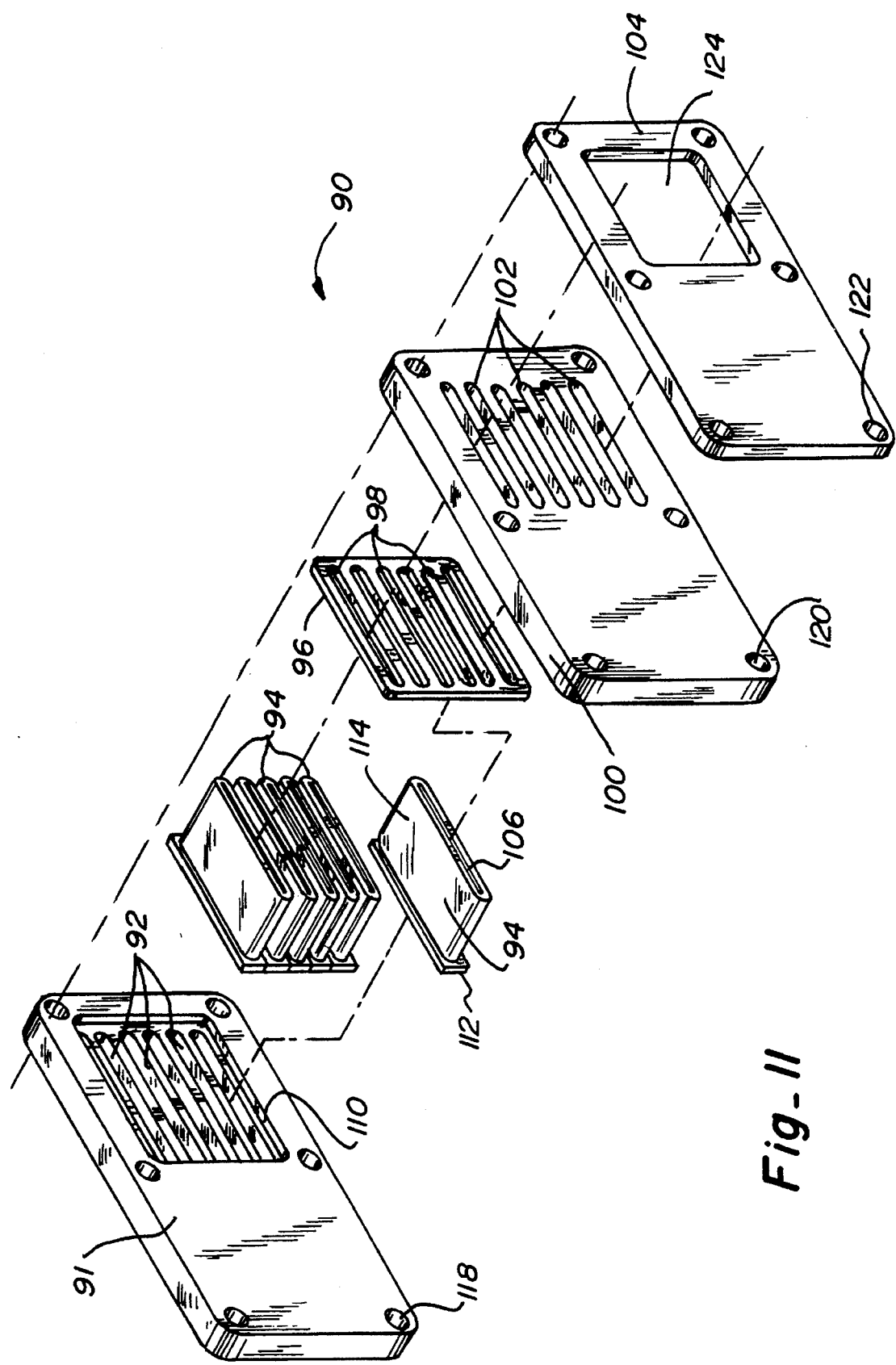
FIG. 11 is an exploded perspective view of all of the components of another embodiment of the penetrator and flexible circuit assembly, other than the flexible circuit.
Figure 12:
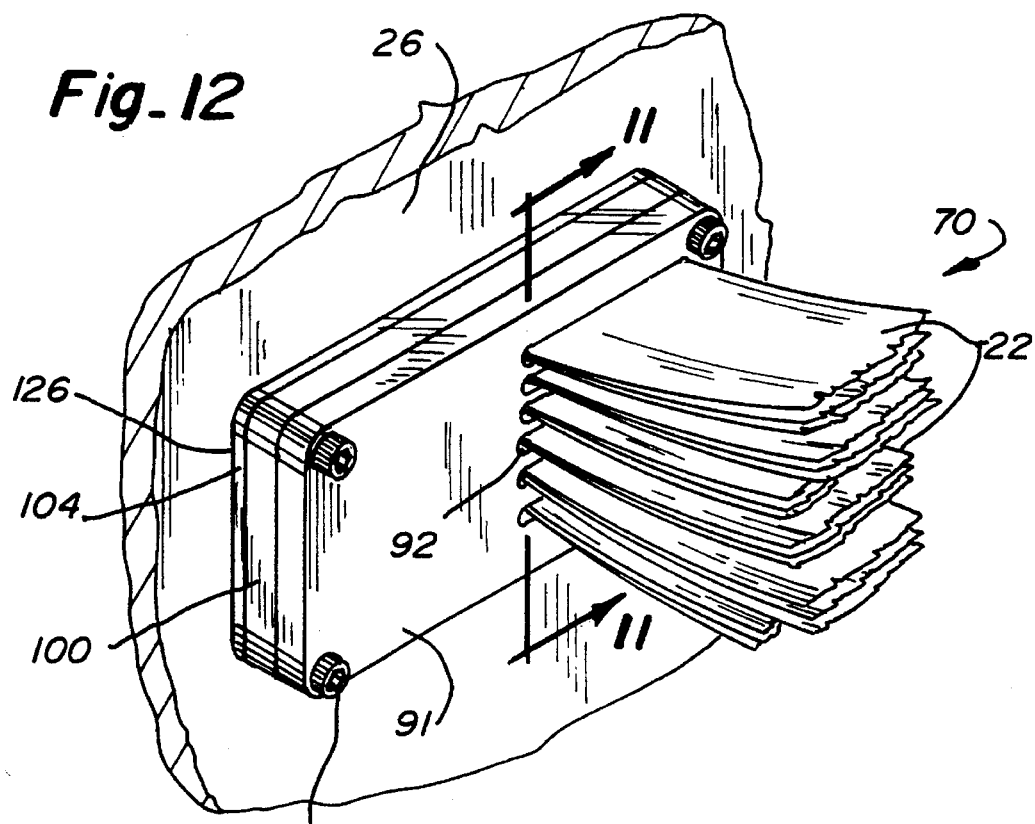
FIG. 12 is a perspective view of the penetrator and flexible circuit assembly shown in FIG. 11, including the flexible circuits and connected to a shell of a supercomputer such as that shown in FIG. 1.
Figure 13:
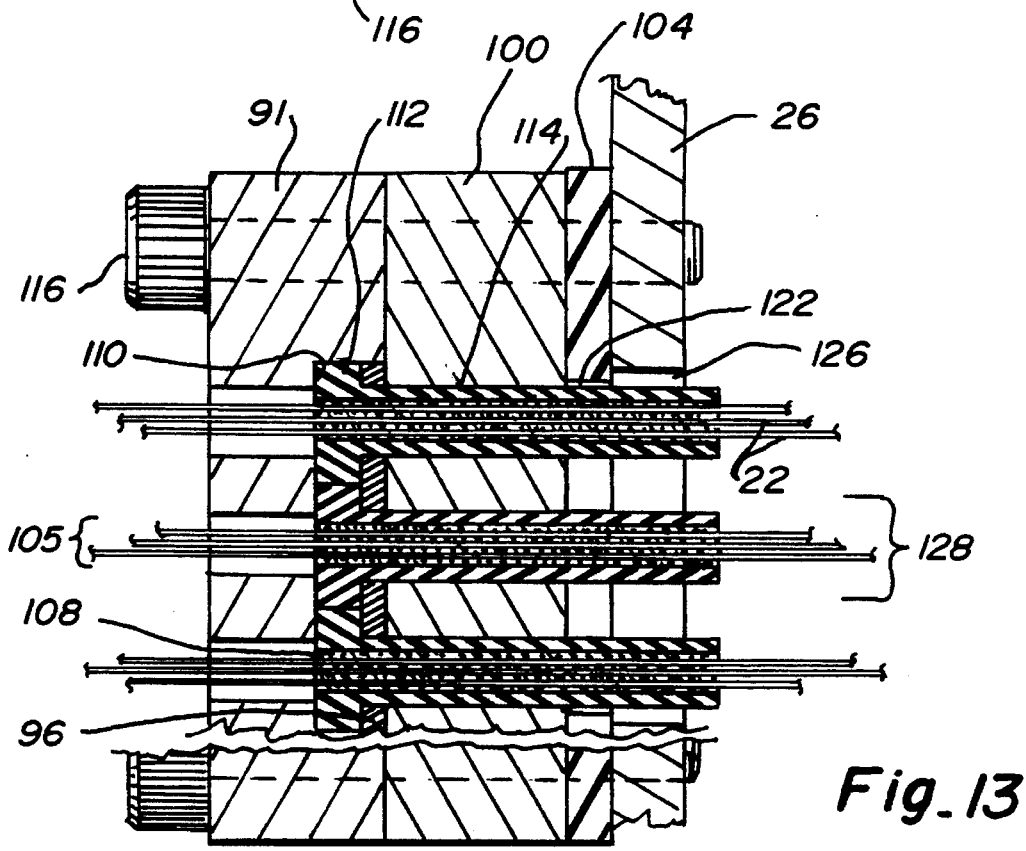
FIG. 13 is a section view taken substantially along the line 13—13 in FIG. 12.

Another embodiment 90 of a penetrator and flexible circuit assembly is shown in FIGS. 11–13. The penetrator and flexible circuit assembly 90 includes a rigid front plate 91 having a plurality of slots 92 formed therein, one penetrator housing 94 for each of the slots 92, a resilient internal gasket 96 with a corresponding number of slots 98, a rigid back plate 100 with another corresponding number of slots 102, a resilient seal gasket 104, and one or more flexible circuits 22. These components are assembled together in the penetrator and flexible circuit assembly 90 as shown in FIGS. 12 and 13.

At least one and preferably a group 105 formed by a plurality, such as three, flexible circuits 22 are mounted in and extend through a passageway 106 formed in each penetrator housing 94. The flexible circuits 22 of the group 105 are stacked on top of one another to form layers of flexible circuits in each passageway 106, as shown in FIG. 13. Epoxy material 108 is inserted between the stacked flexible circuits 22 and surrounding the outer surfaces of the group 105 of flexible circuits to hold all of the flexible circuits in place in the passageway 106 and to form a hermetic seal between the group of flexible circuits and the penetrator housing 94.

The flexible circuits also extend through the slots 92 in the front plate 91 and through the slots 102 in the back plate 100 of the assembly 90. The front plate 91 has a substantially rectangular recess 110 formed therein facing the back plate 100. The recess 110 receives the gasket 96 and a flange portion 112 of each penetrator housing 94. A sleeve portion 114 of each penetrator housing 94 extends away from the flange portion 112 and fits through the slots 98 of the gasket 96. The sleeve portion 114 of the penetrator housing 94 also extends through the slots 102 in the back plate 100.

When the front and back plates 91 and 100 are forced together, the gasket 96 is pinched or compressed within the recess 110 and around the flange and sleeve portions 112 and 114 of the penetrator housings 94. The compressed gasket 96 forms a hermetic seal surrounding the penetrator housings 94 and between the penetrator housings and the adjoining plates 91 and 100. The hermetic seal established by the compressed gasket 96 prevents fluids and gasses from passing through the slots 92 and 102 and around the penetrator housings 94. The epoxy 108 surrounding the flexible circuits within the passageway 106 in each penetrator housing 94 completes the hermetic seal to prevent the passage of fluids and gases through the passageways of the penetrator housings.

To hold the front and back plates 91 and 100 in an abutting relationship and to compress the gasket 96, bolts 116 extend through aligned holes 118 and 120 formed in the front and back plates 91 and 100 and attach to the shell 26 of the supercomputer 24. The seal gasket 104 is positioned between the back plate 100 and the shell 26. Holes 122 are formed in the seal gasket 104 in alignment with the holes 118 and 120 formed in the plates 91 and 100, and the bolts 116 extend through the holes 122. A rectangular opening 124 is formed in the seal gasket 104, and the ends of the sleeve portions 114 of the penetrator housings 94 extend through the opening 124 and through an opening 126 formed in the shell 26.

When the bolts 116 are tightened, the plates 91 and 100 are forced together. The compression of the gasket 96 establishes the hermetic seal around the penetrator housings 94 and between the plates 91 and 100. The compression of the gasket 104 between the shell 26 and the back plate 100 establishes a seal between the back plate and the shell to complete the hermetic seal of the penetrator and flexible circuit assembly 90 to the shell 26 of the supercomputer 24.

The plates 91 and 100 and housings 94, of the assembly 90 are preferably formed of metal, such as aluminum or steel. The gasket 96 is preferably formed of Viton™ plastic. The gasket 104 is preferably formed of rubber. The epoxy 108 is preferably Devcon™ No. 14310.

The components of the assembly 90 may be assembled in the positions shown and described when the assembly is attached to the shell 26 of the supercomputer 24. It is important that each front plate 91, penetrator housing 94, internal gasket 96, back plate 100, and seal gasket 104 is thoroughly cleaned, preferably with isopropyl alcohol, to remove dirt, dust, grease and other materials which may prevent effective sealing of the components of the assembly 90.

To assemble the flexible circuits 22 into the passageway 106 of each penetrator housing 94, flexible circuits of predetermined dimensions are first inserted as a group 105 through the passageway 106 of the corresponding penetrator housing 94. The epoxy 108, or other sealing material, is dispensed from a syringe or tube between adjacent flexible circuits 22 outside of the passageway 106 where the individual flexible circuits 22 can separate from adjoining circuits. A thick bead of epoxy 108 is thus deposited between adjacent flexible circuits 22 of the group 105. The group 105 of flexible circuits 22 is then compressed while still outside of the passageway 106 to distribute the epoxy 108 evenly between the adjacent flexible circuits over an area about the same as the area of the flexible circuit group 128 which will be occupied within the passageway 106. The exterior compression is applied until the thickness of the group 105 of flexible circuits 22 exterior of the passageway 106 is slightly greater than the height (as shown in FIG. 11) of the penetrator housing passageway 106.

The group 105 of flexible circuits 22 is then pulled through the penetrator housing passageway 106 until the epoxied location is within the passageway. During this process, the flexible circuits 22 are further compressed together, with excess epoxy 108 extruded out the around the outside of the group 105 of flexible circuits 22 within the passageway 106. If this extruded extra epoxy within the passageway does not completely occupy the space surrounding the group 105 of flexible circuits 22 within each passageway 106., extra epoxy 108 is applied as necessary into the passageway in any areas not already completely filled with epoxy. The epoxy 108 is then allowed to cure. Each completed penetrator housing 94 and group 105 of flexible circuits 22 is hereinafter referred to a sleeve and circuit subassembly 128.

After all of the sleeve and circuit subassemblies 128 have been assembled, the flexible circuits 22 are threaded through the slots 92, 98 and 102, and through the openings 124 and 126, to establish the positional order and relationship of the elements of the assembly 90 shown. The front plate 91 and back plate 100 are then pressed together, with the flange portion 112 of each penetrator housing 94 and the internal gasket 96 positioned within the recess 110. The bolts 116 maintain the front plate 91, the back plate 100 and the seal gasket 104 in alignment, and tightening the bolts 116 compresses the gaskets 96 and 104 to complete the assembly of the penetrator and flexible circuit assembly 90 and seal it to the shell 26 of the supercomputer 24.

If the quality of the epoxy seal of any subassembly 128 is unsatisfactorily, or if any flexible circuit 22 exhibits any signal conductivity discrepancy, the assembly 90 is relatively easily disassembled, and only the particular malfunctioning subassembly 128 with its group 105 of three flexible circuits 22 needs to be replaced, rather than the whole penetrator. The replacement of a malfunctioning subassembly 128 is efficient due to its modularity. The possibility of malfunctions caused by conductor breaks, shorts and signal path discrepancies are reduced because each flexible circuit 22 is held in the epoxy 108 within a penetrator housing 94. Both the epoxy 108 and the penetrator housing 94 protect the flexible circuits 22 from damage due to inadvertent bending or fracture during mounting of the assembly 90 to the supercomputer 24 or when performing maintenance on the supercomputer.

Presently preferred embodiments of the present invention and many of its improvements have been described with a degree of particularity. It should be understood that the present invention is defined not by this detailed description but by the scope of the following claims.

The invention claimed is:

1. A penetrator and flexible circuit apparatus for transmitting controlled impedance electrical signals between two environments separated by a wall, comprising:

a penetrator housing including a flange portion and a sleeve portion having a passageway through the penetrator housing;

at least one elongated flat flexible circuit having a plurality of hermetically bonded, substantially parallel electrical traces extending therealong, said electrical traces being capable of controlled impedance signal transmission, said flexible circuit extending through said passageway; and a retention material substantially occupying the passageway and surrounding the flat flexible circuit, the retention material retaining the flexible circuit in the passageway of the penetrator housing and establishing a hermetic seal of the flexible circuit within the penetrator sleeve.

2. A penetrator and flexible circuit apparatus as defined in claim 1, further comprising:

a sealing element compressed against the penetrator housing to establish a hermetic seal against the penetrator housing.

3. A penetrator and flexible circuit apparatus as defined in claim 2, wherein:

the hermetic seal of the sealing element is also present between the penetrator housing and the wall.

4. A penetrator and flexible circuit apparatus as defined in claim 2, further comprising:

a plate having a slot in which the penetrator housing is located; and wherein:

the sealing element surrounds the penetrator housing within the slot.

5. A penetrator and flexible circuit apparatus as defined in claim 4, further comprising:

a second plate in addition the plate first aforementioned, the second plate having a slot in alignment with the slot in the first plate; and means for retaining the first and second plates in adjacency with one another; and wherein:

the sealing element surrounding the penetrator housing is positioned between the first and second plates; and the sealing element surrounds the penetrator housing within the slots of the first and second plates.

6. A penetrator and flexible circuit apparatus as defined in claim 5, further comprising:

a gasket positioned between one of the first and second plates and the wall; and means for compressing said gasket between the wall and the one of the first and second plates.

7. A penetrator and flexible circuit apparatus as defined in claim 6, wherein:

the retaining means and the compressing means are the same component, and that component is operative between the other one of the first and second plates and the wall.

8. A penetrator and flexible circuit apparatus as defined in claim 7, wherein:

the first and second plates and the gasket all include holes in alignment with one another; and the same component comprises an elongated fastener extending through the holes in the plates and the gasket and operative to apply a force between the other one of the first and second plates and the wall to compress the gasket and the sealing element.

9. A penetrator and flexible circuit apparatus as defined in claim 8, further comprising:

a plurality of penetrator housings positioned between the first and second plates.

10. A penetrator and flexible circuit apparatus as defined in claim 9, further comprising:

a plurality of flexible circuits located in the passageway of each housing.

11. A penetrator and flexible circuit apparatus as defined in claim 5, further comprising:

a plurality of penetrator housings positioned between the first and second plates; and wherein:

the sealing element includes a plurality of slots formed therein;

each penetrator housing extends through one of said slots in the sealing element; and the retaining means applies a force between the first and second plates to compress the sealing element to form the hermetic seal at the slots of the plates and against the penetrator housing.

12. A penetrator and flexible circuit apparatus as defined in claim 11, further comprising:

a gasket positioned between one of the first and second plates and the wall; and means for compressing gasket between the wall and the one of the first and second plates.

13. A penetrator and flexible circuit apparatus as defined in claim 12, wherein:

the retaining means and the compressing means are the same component, and that component is operative between the other one of the first and second plates and the wall.

14. A penetrator and flexible circuit apparatus as defined in claim 13, further comprising:

a plurality of flexible circuits located in the passageway of each housing.

15. A penetrator and flexible circuit apparatus as defined in claim 5, wherein the wall is part of a shell of a computer, and the interior of the shell of the computer contains cooling fluid for cooling the computer.

16. A penetrator and flexible circuit apparatus as defined in claim 3, wherein the wall is part of a shell of a computer, and the interior of the shell of the computer contains cooling fluid for cooling the computer.

17. A penetrator and flexible circuit apparatus as defined in claim 1, further comprising:

a plurality of flexible circuits located in the passageway of the housing.

18. A penetrator and flexible circuit apparatus as defined in claim 17, wherein:

the plurality of flexible circuits are stacked on top of one another as a group.

19. A penetrator and flexible circuit apparatus as defined in claim 17, wherein:

the retaining material is epoxy;

the epoxy surrounds each of the flexible circuits in the group; and the epoxy surrounds the group within the passageway.

20. A penetrator and flexible circuit apparatus as defined in claim 17, wherein the wall is part of a shell of a computer, and the interior of the shell of the computer contains cooling fluid for cooling the computer.

21. A method for communicating electrical signals into and out of a computer having elements hermetically enclosed within a shell within which fluid under pressure is also confined, the electrical signals having a sufficiently high communication frequency to be susceptible to substantial signal degradation due to insulation impedance variations, comprising the steps of:

inserting at least one elongated flat flexible circuit having a plurality of parallel controlled impedance electrical traces extending therealong into a passageway of a penetrator housing;

positioning the elongated flat flexible circuit to extend both ends of the flexible circuit out of the passageway on opposite ends of the passageway and away from the penetrator housing;

establishing a first hermetic seal between the flexible circuit and the penetrator housing within the passageway;

retaining the flexible circuit in the passageway of the penetrator housing to maintain the first hermetic seal; and establishing a second hermetic seal between the penetrator housing and the shell of the computer.

22. A method as defined in claim 21, further comprising the step of:

inserting a sealing material in the passageway and substantially surrounding the flexible circuit to establish the first hermetic seal and to retain the flexible circuit in the passageway.

23. A method as defined in claim 22, wherein the step of inserting the sealing material further comprises:

placing a fluid epoxy material in the passageway as the sealing material; and allowing the epoxy material to cure into a solid.

24. A method as defined in claim 23, further comprising the steps of:

inserting a plurality of elongated flat flexible circuits into the passageway; and placing the fluid epoxy material between the flexible circuits and surrounding the circuits within the passageway.

25. A method as defined in claim 24, further comprising the steps of:

orienting the plurality of flexible circuits in a stack in which the circuits rest upon one another;

separating each flexible circuit from an adjoining flexible circuit;

placing the fluid epoxy material between the flexible circuits while the adjoining flexible circuits are separated; and drawing the stack of flexible circuits simultaneously into the passageway to distribute the fluid epoxy material between and around the flexible circuits of the stack.

26. A method as defined in claim 22, wherein the step of establishing the second hermetic seal further comprises the steps of:

placing a gasket between the penetrator housing and the shell; and compressing the gasket between the penetrator housing and the shell.

27. A method as defined in claim 26, further comprising the steps of:

attaching the penetrator housing to the shell by force applied therebetween, the force also compressing the gasket.

* * * * *